(12) United States Patent
Shinotsuka

(10) Patent No.: US 7,679,654 B2
(45) Date of Patent: Mar. 16, 2010

(54) DETECTING PHASE AND FREQUENCY OF LIGHT SOURCE FLICKER AND DRIVING IMAGE SENSOR IN PHASE WHEN LIGHT SOURCE FLICKER IS BRIGHTEST

(75) Inventor: Sukeyuki Shinotsuka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 863 days.

(21) Appl. No.: 11/077,137

(22) Filed: Mar. 7, 2005

(65) Prior Publication Data
US 2005/0225649 A1 Oct. 13, 2005

Related U.S. Application Data

(63) Continuation of application No. PCT/JP03/11139, filed on Sep. 1, 2003.

(30) Foreign Application Priority Data
Sep. 9, 2002 (JP) ............................. 2002-302357

(51) Int. Cl.
*H04N 9/73* (2006.01)
(52) U.S. Cl. ................. 348/227.1; 348/228.1
(58) Field of Classification Search ............ 348/226.1, 348/227.1, 228.1, 222.1, 308, 310
See application file for complete search history.

(56) References Cited

U.S. PATENT DOCUMENTS

| | | | | |
|---|---|---|---|---|
| 4,605,952 A | * | 8/1986 | Powers | 375/240.01 |
| 5,254,868 A | * | 10/1993 | Saito | 257/432 |
| 6,275,307 B1 | * | 8/2001 | Segawa | 358/446 |
| 6,295,085 B1 | * | 9/2001 | Munson et al. | 348/226.1 |
| 6,710,818 B1 | * | 3/2004 | Kasahara et al. | 348/607 |
| 6,999,118 B2 | * | 2/2006 | Suzuki | 348/226.1 |
| 7,034,870 B2 | * | 4/2006 | Nagaoka et al. | 348/228.1 |
| 7,187,405 B2 | * | 3/2007 | Poplin et al. | 348/226.1 |

FOREIGN PATENT DOCUMENTS

| | | |
|---|---|---|
| JP | 5-115024 | 5/1993 |
| JP | 5-219443 | 8/1993 |
| JP | 5-316430 | 11/1993 |
| JP | 05-316430 | * 11/1993 |
| JP | 05316430 A | * 11/1993 |
| JP | 6-209427 | 7/1994 |
| JP | 06209427 A | * 7/1994 |
| JP | 7-46481 | 2/1995 |
| JP | 2000-244822 | 9/2000 |
| JP | 2000-329616 | * 11/2000 |
| JP | 2001-86401 | 2/2001 |

* cited by examiner

*Primary Examiner*—Ngoc-Yen T Vu
(74) *Attorney, Agent, or Firm*—Fulbright & Jaworski LLP

(57) ABSTRACT

An image sensor comprising a number of light sensor circuits each representing a unit pixel and capable of outputting a sensor signal corresponding to a photo current produced in a photoelectric converting element in proportion to light falling thereon, which is provided with a way of detecting a period and a phase of flicker in light from a light source and a way of determining timing of obtaining the maximum brightness of the light source based on the flicker detection signal and reading sensor signals from respective pixels at the timing determined. This image sensor can easily prevent the effect of flicker resulting from flicker of the light source to an image taken and displayed by the image sensor with no need for adjusting the time of accumulating a charge in the capacitor in accord with incident light thereon and compensating an image signal to be displayed.

3 Claims, 14 Drawing Sheets

DETECTING PHASE AND FREQUENCY OF LIGHT SOURCE FLICKER AND DRIVING IMAGE SENSOR IN PHASE WHEN LIGHT SOURCE FLICKER IS BRIGHTEST

BACKGROUND OF THE INVENTION

The present invention relates to an image sensor comprised of a number of light sensor circuits each representing a unit pixel, which circuit is capable of producing in a photoelectric converting element a photo current proportional to a quantity of incident light falling thereon, accumulating a corresponding amount of electric charge in a parasitic capacitor of the photoelectric converting element and outputting a sensor signal, and more specifically to an image sensor which is provided with means for preventing the effect of flickering of light from the light source.

There has been developed a conventional light sensor circuit having a wide dynamic range, which comprises a photodiode PD operating as a photoelectric converting element for producing a photo current proportional to the quantity of incident light Ls falling thereon, a transistor having a logarithmic output characteristic in a weak inverse state for converting the photo current produced in the photodiode into a voltage signal by using its sub-threshold region characteristic (Japanese Laying-Open Patent Publications Nos. H05-219443 and H07-46481).

There also has been developed an image sensor comprising a number of the light sensor circuits each provided with a means for changing a drain voltage of the transistor to a value lower than a normal level value for a specified period to remove a charge accumulated in a parasitic capacitor of the photodiode to initialize the circuit (Japanese Laying-Open Patent Publication No. 2000-329616).

In the image sensor using a number of light sensor circuits each of which represents a unit pixel and works by producing in a photoelectric converting element a photo current proportional to a quantity of incident light falling thereon, accumulating a corresponding amount of electric charge in a parasitic capacitor of the photoelectric converting element and outputting a sensor signal, there may arise such a problem that pixels react to flickering of light of the light source such as a fluorescent lamp (brightness fluctuations in accordance with frequency of light of the light source), resulting in flickering in an image taken and displayed by the image sensor due to a difference between a flicker period of the light source and the video display rate. In this instance, the brightness of light of the light source at the time of reading sensor signals from the respective pixels becomes predominant in the image to be displayed. For example, a fluorescent lamp connected to a power source of a commercial frequency of 50 Hz flickers per period of $1/(2 \times 50 \text{ Hz})$.

On the other hand, the video display rate is of $\frac{1}{60}$ Hz for each frame. A least common multiple of the flicker period of the fluorescent lamp and the video display rate is a flicker period T of 0.05. Accordingly, flicker may be perceived in an image taken by the image sensor when it is displayed at $1/T=20$ Hz on the display screen.

The image sensor using a number of light sensor circuits each of which represents a unit pixel and works by producing a photo current proportional to a quantity of incident light falling thereon, accumulating a corresponding amount of electric charge and outputting a sensor signal, the effect of flicker resulting from flicker of the light source can be prevented by adjusting the time of storing respective pixel signals. For example, it is possible to reduce the effect of flicker by adjusting amounts of accumulated charge of respective pixels to the same by using an electronic shutter to expose for $\frac{1}{100}$ seconds light from the light source of the commercial frequency of 50 Hz. The provision of the electronic shutter may complicate the construction for preventing the flicker.

In Japanese Laid-Open Publications Nos. H05-115024 and 2001-86401, there is disclosed a conventional video camera using an array of solid-state light sensitive elements, which is provided with means for obtaining light source information by detecting a period and a phase of flicker in the light source and preventing the occurrence of flicker in an image by compensating the image signal based on the obtained light source information.

However, the means for detecting flicker conditions of light of the light source and compensating the image signal based on the light source information for removing the effect of flicker is complicate in construction. In order to sufficiently prevent flicker it is also needed to use a further complicated means for compensating image signals.

The image sensors of the type having a matrix of light sensor circuits using a number of light sensor circuits, each of which represents a unit pixel and works by producing in a photoelectric converting element a photo current proportional to a quantity of incident light falling thereon, accumulating a corresponding amount of electric charge in a parasitic capacitor of the photoelectric converting element and outputting a sensor signal, are further provided with means for preventing the occurrence of flicker resulting from flicker of the light source in an image taken and displayed on a display screen by controlling an electronic shutter provided for evenly storing all electric charges of respective pixels or by detecting flicker condition of the light source and compensating image sensor signals according to the detected flicker condition information. All the flicker preventing means considerably complicate the construction of the image sensors.

SUMMARY OF THE INVENTION

Accordingly, the present invention has as its principal object the provision of an image sensor using a matrix of light sensor circuits each of which represents a unit pixel and outputs a sensor signal corresponding to a photo current flowing in a photoelectric converting element in proportion to a quantity of incident light falling thereon when taking an image, which circuit is provided with means for detecting a flickering period and phase of a light source by determining a change in the light detection signal which is a photo current produced by incident light entering a PN junction of a transistor for outputting a sensor signal in a light sensor circuit, determining timing of attaining the highest brightness of the light source on the basis of the a period and a phase of a flicker detected in light from a light source and reading pixel sensor signals of respective light sensor circuits at the detected timing. This can easily prevent the occurrence of flicker resulting from the light source without using the conventional complicated means.

PREFERRED EMBODIMENTS OF THE PRESENT INVENTION

Figure 1:
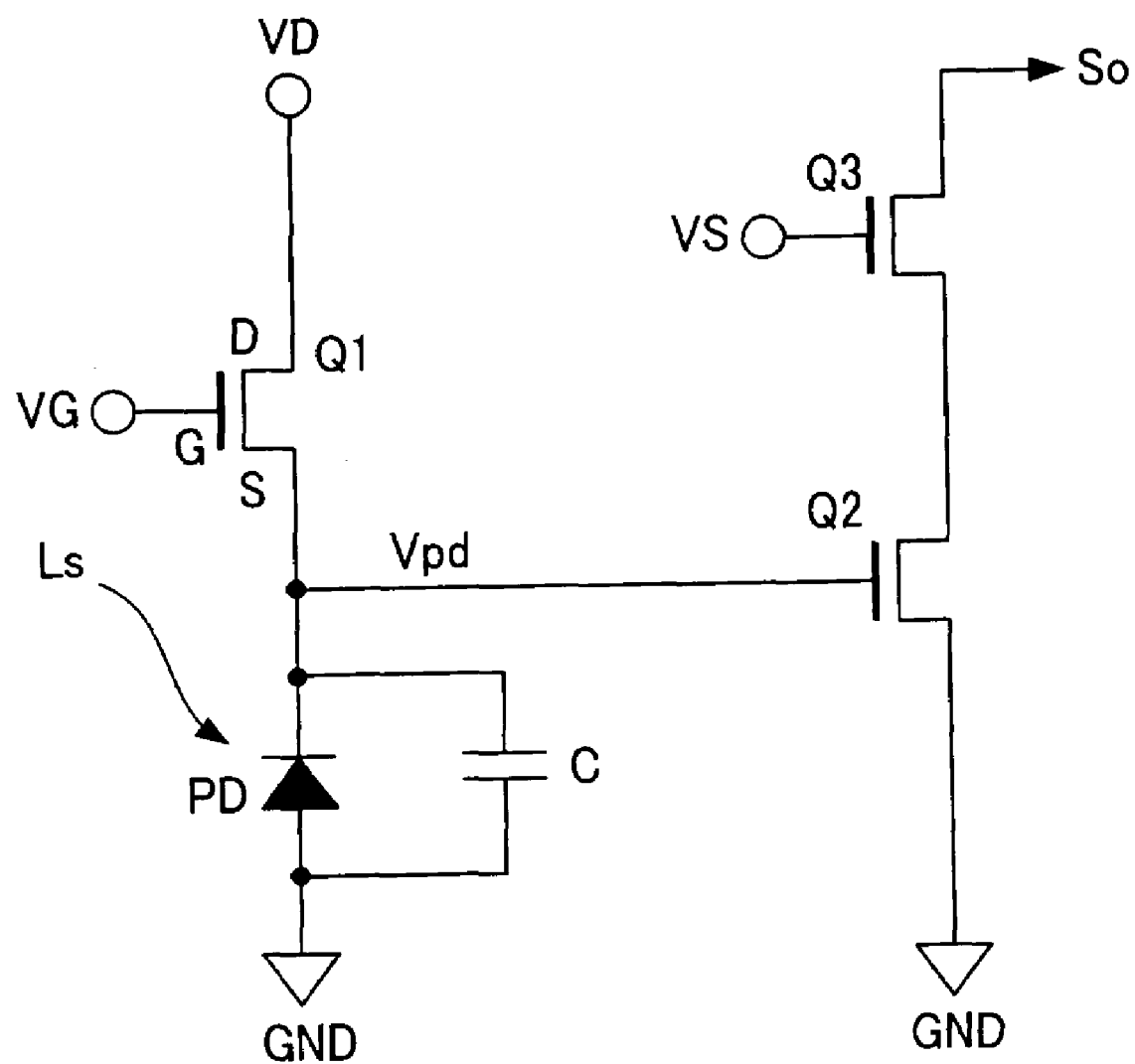
FIG. 1 is a basic electric circuit diagram of a light sensor circuit for one pixel, which is used as a unit component of an image sensor.

FIG. 1 shows a basic circuit diagram of a light sensor circuit used as a unit pixel of an image sensor. This light sensor circuit comprises a photodiode PD operating as a photoelectric converting element for producing a photo current proportional to a quantity of incident light Ls falling thereon, a transistor Q1 having a logarithmic output characteristic in a weak inverse state for converting the photo current produced in the photodiode into a voltage signal Vpd by using its sub-threshold region characteristic, a transistor Q2 for amplifying the voltage signal Vpd and a transistor Q3 for outputting a sensor signal in accordance with a timing pulse of a readout signal Vs. In FIG. 1, character C designates a parasitic capacitor composed of junction capacity and wiring capacity of the photo diode PD.

Figure 2:
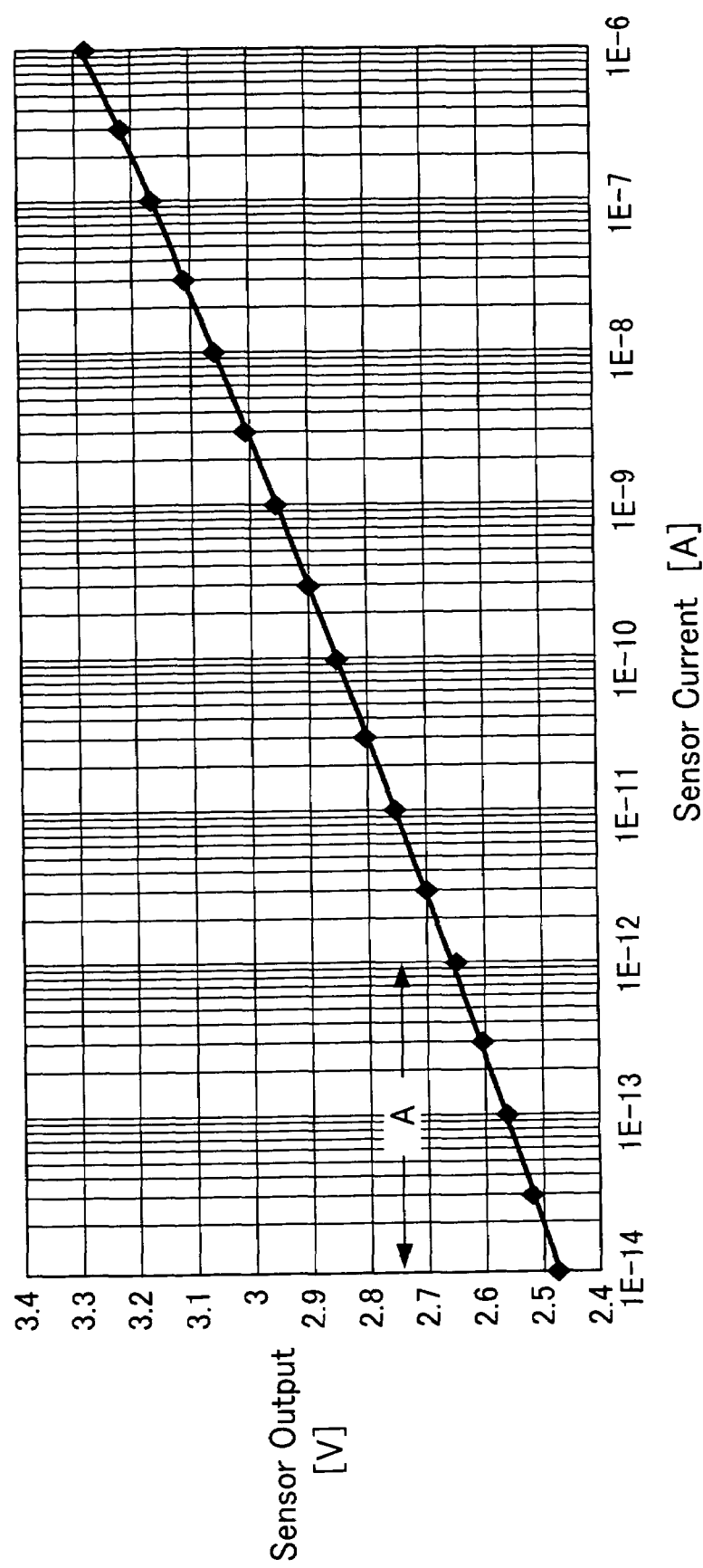
FIG. 2 shows an output characteristic of a pixel signal versus a photo current flowing in a photo diode of a light sensor circuit having a complete logarithmic output characteristic.

The operation of the transistor Q1 with a logarithmic output characteristic is as follows:

When the transistor with a gate voltage VG fixed to a constant value is driven in a weak inverse state, an electric charge produced by incident light Ls is discharged to the drain D in a sub-threshold region of the transistor, thereby attaining a complete logarithmic output characteristic as shown in FIG. 2.

Since the resistance of the transistor Q1 increases logarithmically with a small quantity of incident light, the discharging rate of the parasite capacitor C decreases, causing a capacitive afterglow due to a remaining charge. In that case, if there is a moving bright point in a dark background on a display screen, it exhibits a remarkable tailing phenomenon. In FIG. 2, A designates a region of the output characteristic, where an afterglow may appear in particular when the photocurrent changes from a bright current to a dark current. When the parasitic capacitor C of the photodiode is charged by changing the drain voltage VD of the transistor Q1 to a value lower than the normal before detecting a light signal, a large amount of charge is newly injected into the parasitic capacitor with a remaining charge. After initializing the light sensor circuit by removing the electric charge remaining in the parasite capacitor, the drain voltage VD of the transistor Q1 is restored to the normal value and, at the same time, the recharging in accordance with the quantity of incident light Ls starts, thereby preventing the occurrence of afterglow.

Figure 3:
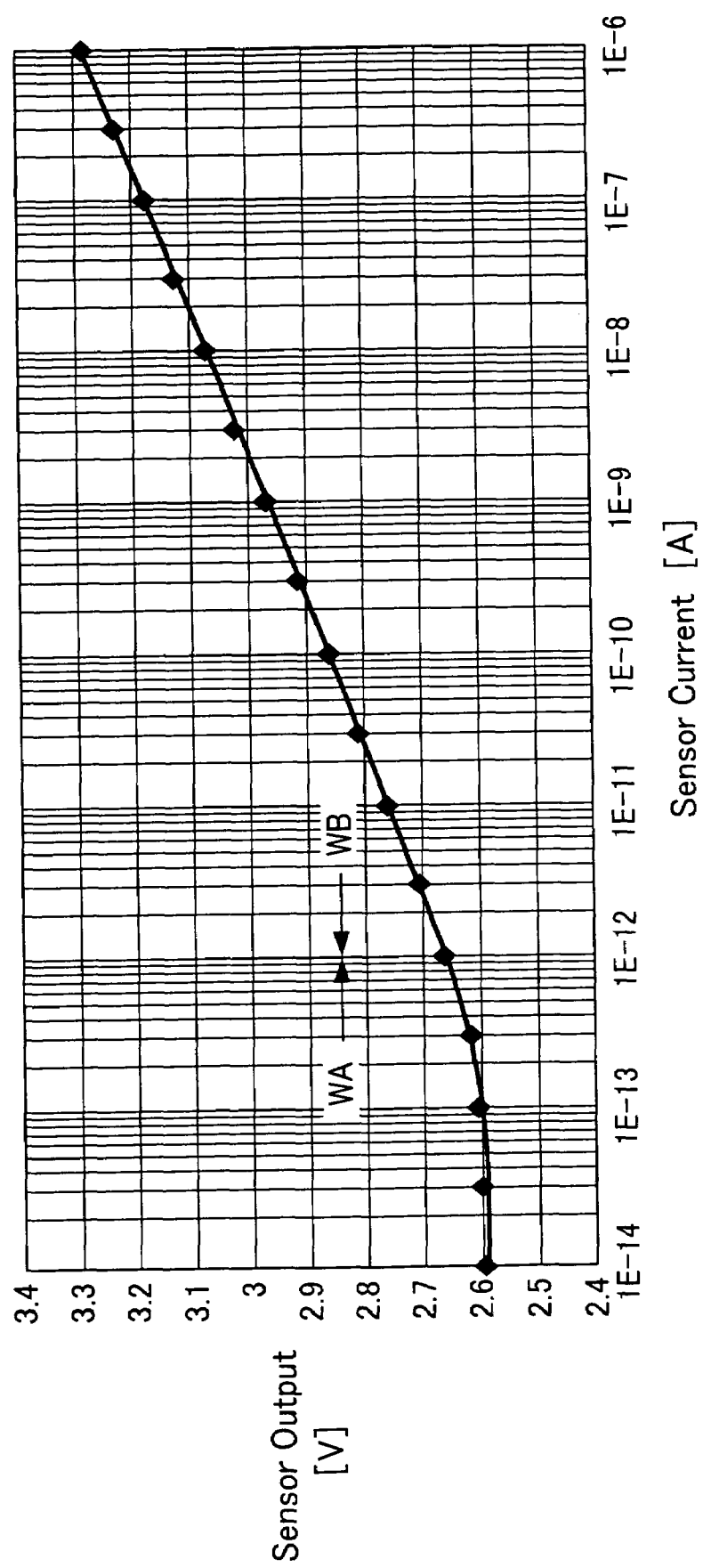
FIG. 3 shows an output characteristic of a pixel signal versus a photo current flowing in a photo diode of a light sensor circuit having a logarithmic output characteristic, which circuit is further provided with a means of initializing the circuit to prevent the occurrence of afterglow.

As shown in FIG. 3, the output characteristic of the light sensor circuit provided with an initializing means is logarithmic at a sufficient photo current produced in the photodiode in accordance with a quantity of light falling on the photo diode PD serving as a photoelectric converting element LE. However, the output characteristic of the same light sensor circuit is substantially linear, not logarithmic, at a small value of the photo current because of the delayed response when charging the parasitic capacitor C of the photoelectric converting element. In FIG. 3, WA indicates the non-logarithmic response region and WB indicates the logarithmic response region.

As shown in FIG. 3, the logarithmic output characteristic is lost in a region WA with a small quantity of incident light but no afterglow occurs.

Figure 4:
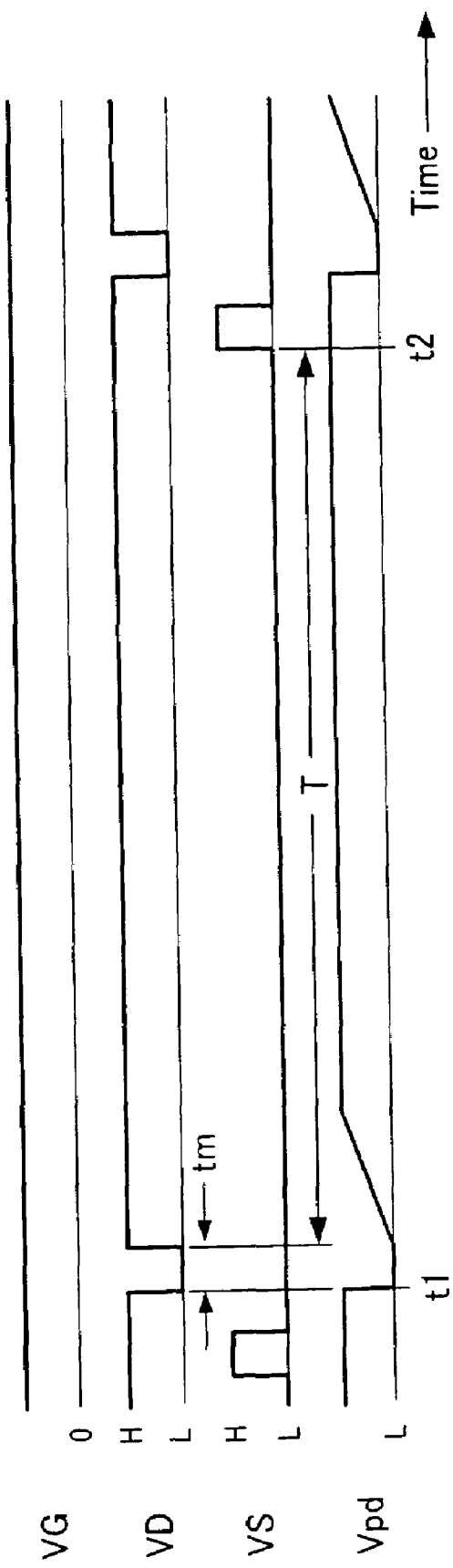
FIG. 4 is a time chart of signals generated at respective portions of the light sensor circuit having an initializing means.

FIG. 4 shows a time chart of signals produced at respective portions of the light sensor circuit in that case. In FIG. 4, t1 is an initializing timing pulse and t2 is a light-signal detection timing pulse. A specified time tm for which the drain voltage VD of the transistor Q is switched from a high level H (normal value) to a lower level L (a value lower than the normal value) and kept thereat is set for example to about 5 microseconds in case of reading a pixel at a speed of about 100 nanoseconds. In FIG. 4, T designates a period for accumulating a charge in a parasitic capacitor C of the photoelectric converting element.

Figure 5:
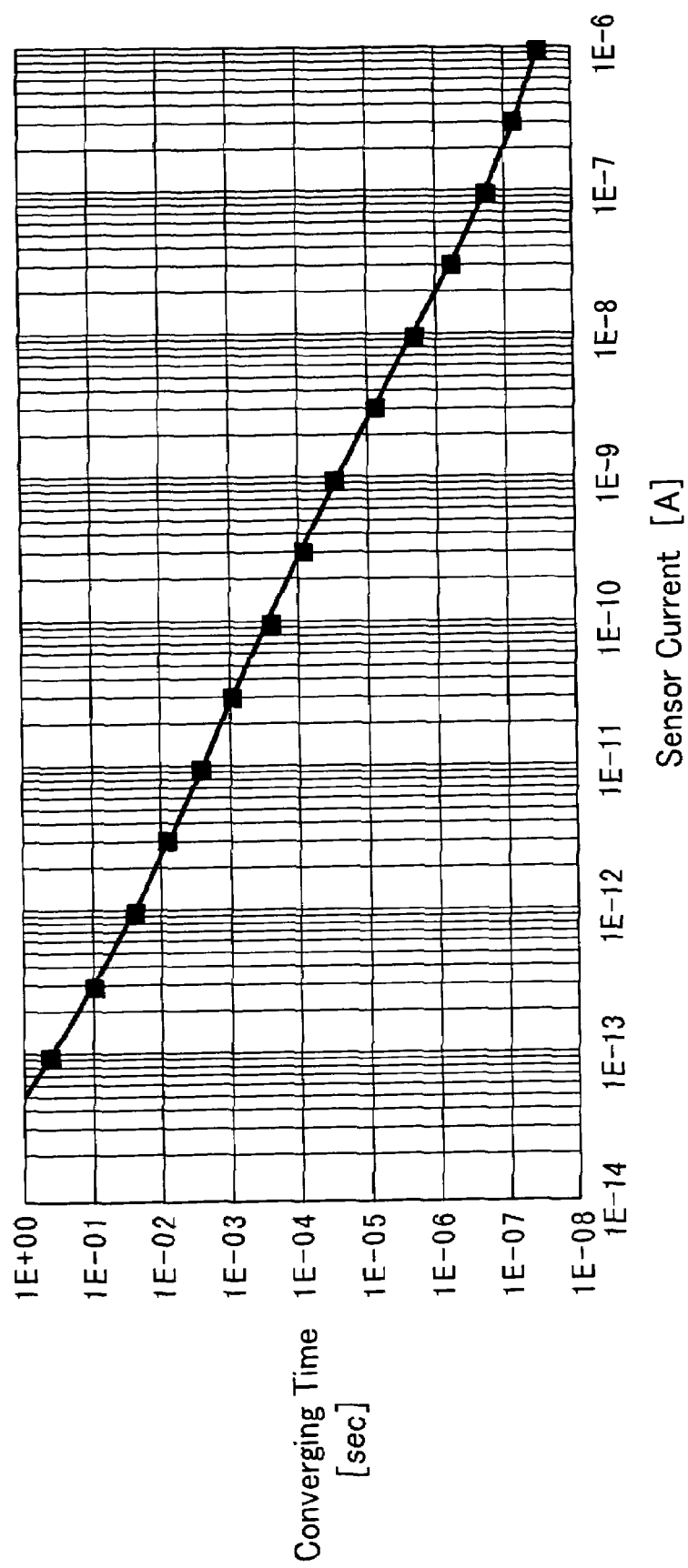
FIG. 5 shows a characteristic of the time necessary for converging a sensor signal in relation to a sensor current in a light sensor circuit having a complete logarithmic output characteristic.

FIG. 5 show a characteristic of a time necessary for converging a sensor signal in relation to a sensor current in a light sensor circuit having a complete logarithmic output characteristic as shown in FIG. 2.

It is apparent from the characteristic of FIG. 5 that a sensor signal can be established at a high speed when taking an image with bright light by an image sensor with a large amount of sensor current flowing in a photodiode PD. In a light sensor circuit provided with an initializing means, it is also obtained a relation between a converging time of a sensor signal and a sensor current in the logarithmic response region WB as shown in FIG. 3. Namely, it is possible to establish a light sensor signal at a high speed with bright illumination and, therefore, with a large amount of a light sensor current flowing in a photodiode of the light sensor circuit.

In a case when an image illuminated by a fluorescent lamp is taken by an image sensor composed of the above-described light sensor circuits each representing a unit pixel, it is possible to immediately establish a complete image from respective pixels by reading respective light sensor signals at the timing of brightest illumination of the fluorescent lamp operating with brightness fluctuations at a period in accordance with the frequency of a power supply source.

Figure 6:
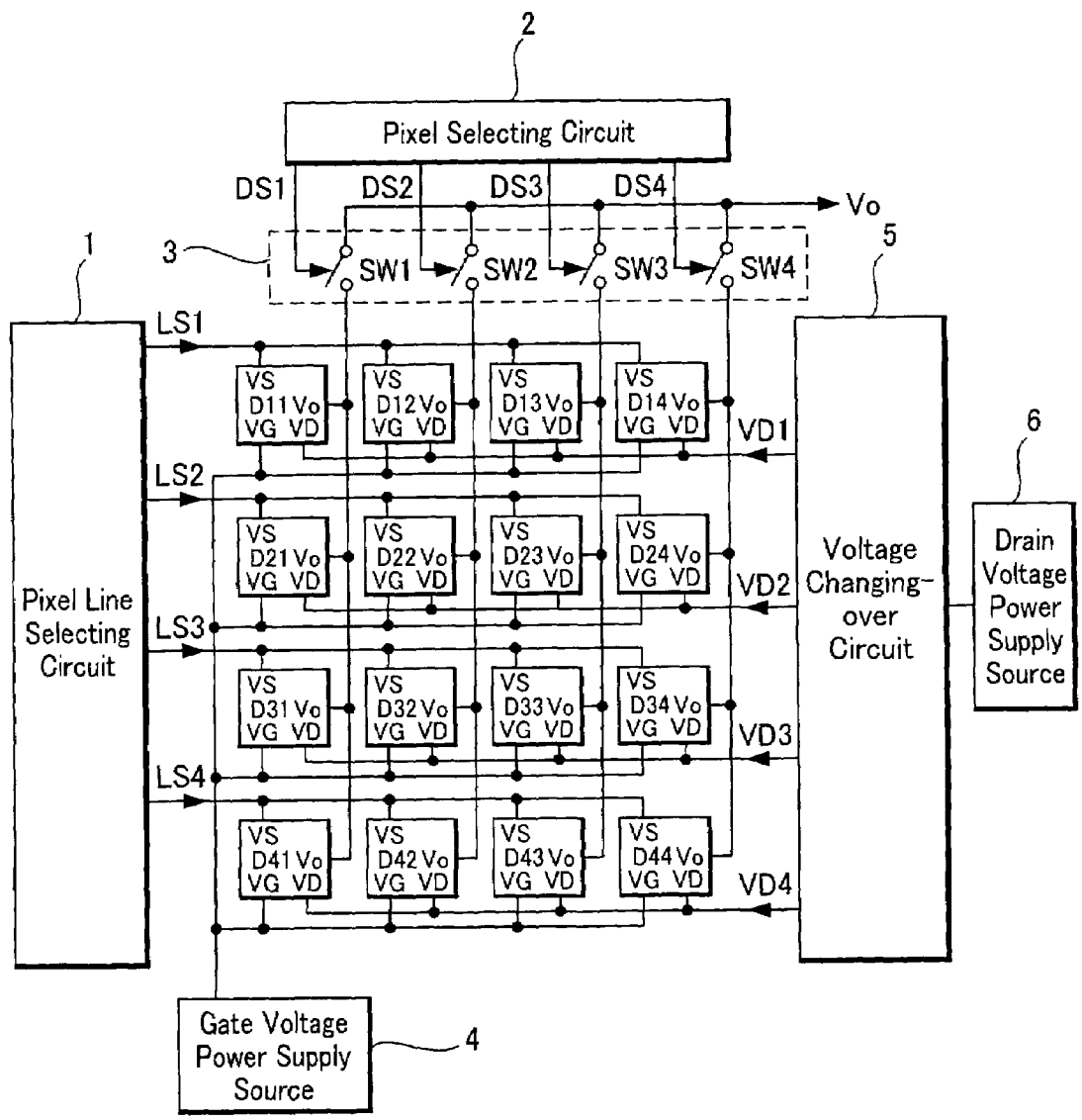
FIG. 6 is a block diagram showing an exemplary structure of an image sensor composed of a number of light sensor circuits each representing a unit pixel.

FIG. 6 shows an exemplary construction of an image sensor comprising a number of the above-described light sensor circuits arranged to form a matrix of pixels (i.e., light sensor circuits), wherein sensor signals So from respective pixels are read by scanning in a time series.

Figure 11:
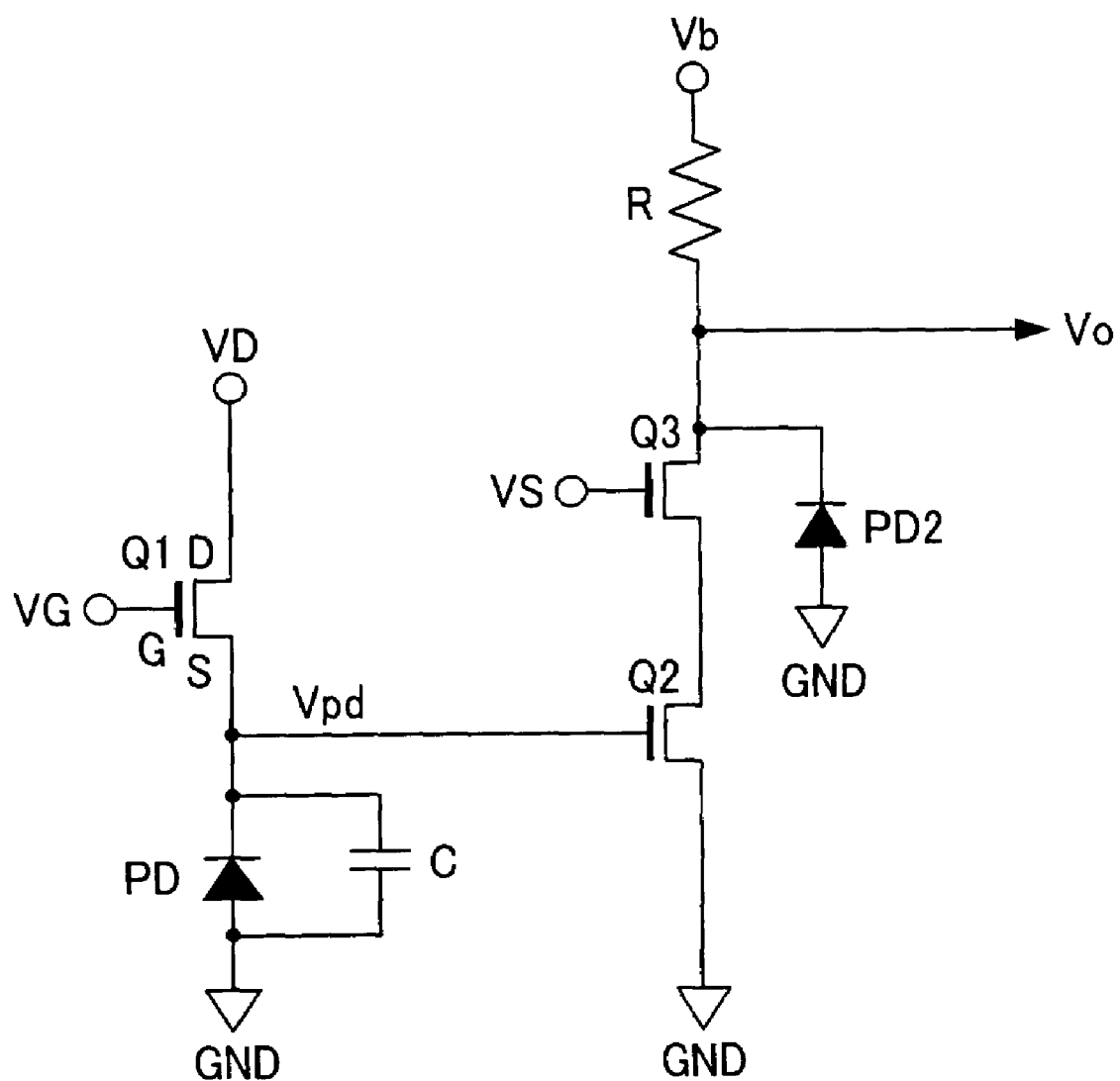
FIG. 11 is an equivalent electric circuit diagram of each transistor in a light sensor circuit when a PN junction of the transistor serves as a photo diode for detecting incident light falling thereon.

The image sensor is composed of 4×4 pixels D11-D44 arranged in a matrix of pixel circuits, wherein pixel lines are selected one by one with respective selecting signals LS1-LS4 sequentially output from a pixel line selecting circuit 1 and pixels in each selected pixel-line are readout one by one as respective sensor signals So in such a manner that selecting signals DS1-DS4 sequentially output from a pixel selecting circuit 2 turn ON corresponding switches SW1-SW4 to read sensor signals So in a time series. In FIG. 6, numeral 4 designates a power source for a gate voltage VG of the transistor Q1, numeral 6 designates a power source for a drain voltage VD of the transistor Q1. As shown in FIG. 11 each of the sensor signals So sequentially readout from respective pixels is converted into a specified voltage signal Vo by applying a bias voltage Vb through a reference resistance R. The image sensor is also provided with a voltage switching-over circuit 5 by which a drain voltage VD of each transistor Q1 for each pixel is changed to a normal high-level. H or an initializing lower level L by the effect of a specified timing pulse.

Figure 7:
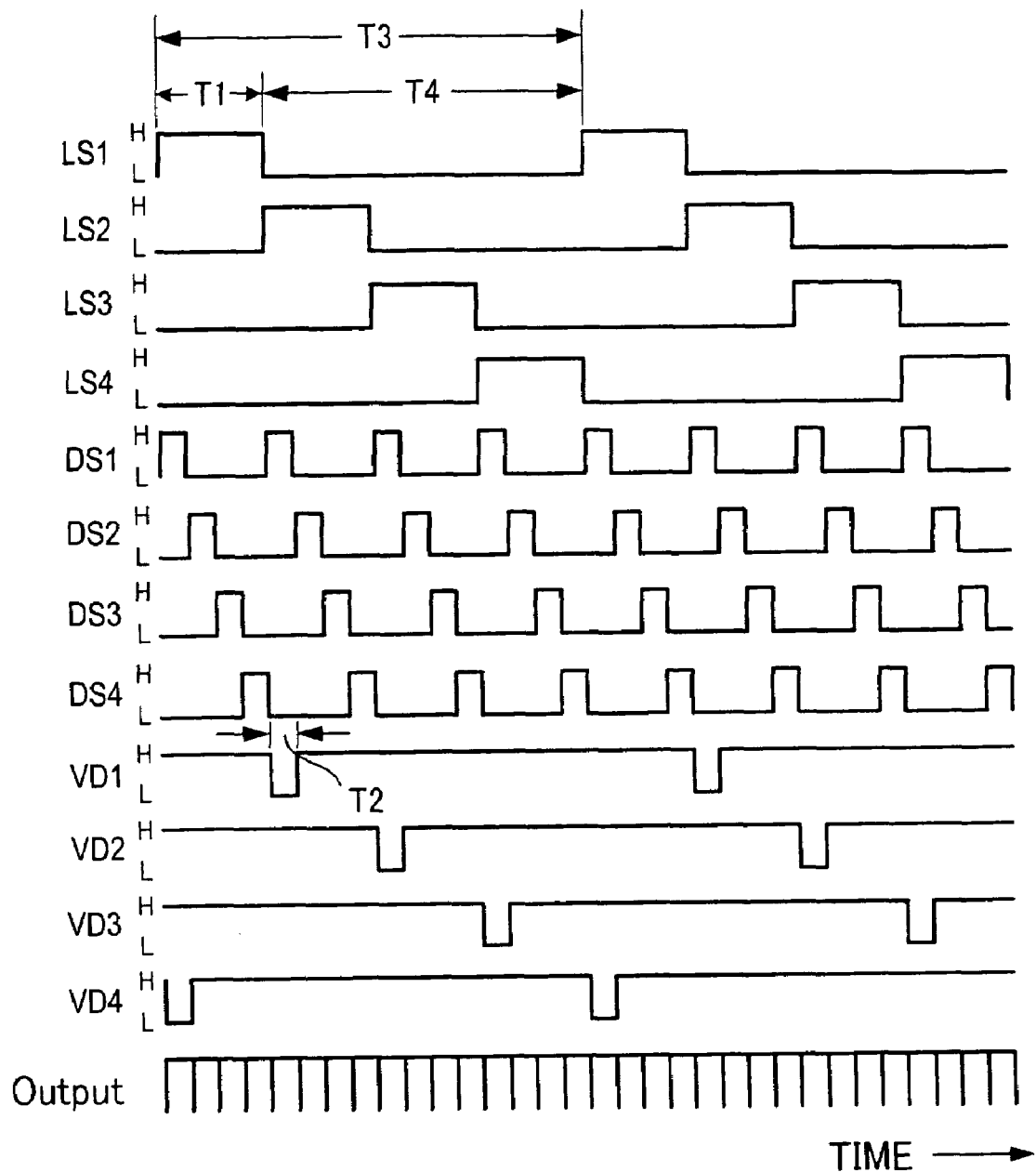
FIG. 7 is a time chart of signals generated at respective portions of the image sensor of FIG. 6.

Referring now to FIG. 7 showing a time chart of signals generated at respective portions of the thus constructed image sensor, the operation of the image sensor will be described as follows:

The image sensor is provided with a voltage switching-over circuit 5 by which a drain voltage VD of each transistor Q1 for each pixel is changed from a normal high-level H to an initializing lower level L and reverse by the effect of specified timing pulses when selecting each line of pixels.

The operation of the above-described image sensor to which the present invention is applied will be described with reference to FIGS. 6 and 7 showing a time chart of signals generated at respective portions of the image sensor.

Once the pixel-line selecting signal LS1 reached the high level H, the first pixel line including pixels D11, D12, D13 and D14 is selected and, during a specified period T1 of the signal LS1 remaining at the high level H, pixel selecting signals DS1-DS4 successively reach the high level H to start the successive reading of pixel signals Vo from the pixels D11, D12, D13 and D14.

As soon as the pixel-line selecting signal LS1 was changed to the low level, a next pixel-line selecting signal LS2 is changed to the high level H to select the second pixel line containing pixels D21, D22, D23 and D24. For a specified period T1 of the signal LS2 remaining at the high level, the pixel selecting signals DS1-DS4 successively reach the high level H to start the successive reading of pixel signals Vo from pixels D21, D22, D23 and D24.

Similarly, with the pixel-line selecting signals LS3 (LS4) changed to the high level H, the third (fourth) pixel line is selected and then, for a specified period T1 for which the signal LS3 (LS4) remains at the high level H, the pixel selecting signals DS1-DS4 successively reaches the high level H to start the successive reading of pixel signals Vo from pixels D31, D32, D33 and D34 (D41, D42, D43 and D44).

When the pixel-line selecting signal LS1 was changed to the low level L after the period T1, the drain voltage VD1 for the pixels D11, D12, D13 and D14 in the first selected line is turned to the low level for a specified period T2 to make the pixels initialized and prepared for the next cycle of reading the pixel signals, which cycle will be performed at an interval of one cycle time T3.

When the pixel-line selecting signal LS2 was changed to the low level L after the period T1, the drain voltage VD1 for the pixels D21, D22, D23 and D24 in the second selected line is turned to the low level L for the specified period T2 to initialize the pixels for the next sensor-signal reading cycle to be performed at an interval of one cycle time T3.

Similarly, once the pixel-line selecting signal LS3 (LS4) was changed to the low level L after the period T1, the drain voltage VD3 (VD4) for the pixels in the third (fourth) selected line is turned to the low level L to initialize the pixels for the next sensor-signal reading cycle to be performed at an interval of one cycle time T3. In FIG. 7, T4 designates the duration for accumulating a charge corresponding to an amount of incident light falling on each pixel circuit without reading a signal from the same circuit.

The timing of occurrence of signals at respective portions is decided by driving the pixel-line selecting circuit 1, the pixel selecting circuit 2 and the voltage switching-over circuit 5 under the control from a control circuit (not shown).

Initializing each pixel at the timing adapted to scanning for reading each pixel signal may avoid an over or short charge accumulating duration for a whole system of the image sensor.

An image sensor having a wide dynamic range of its logarithmic output characteristic with no afterglow of any pixel can be thus realized.

Figure 8:
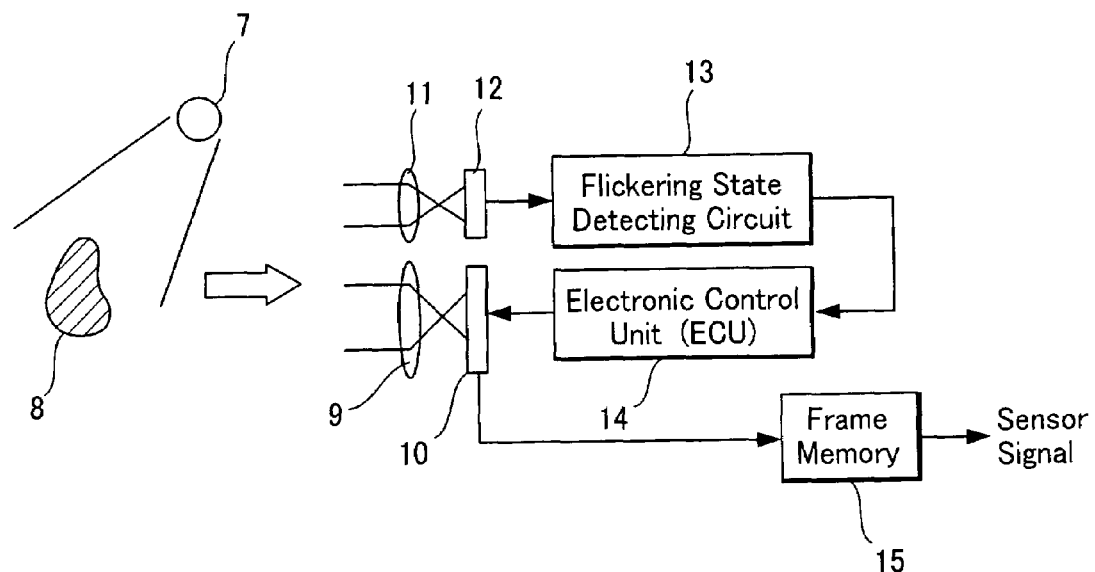
FIG. 8 is a block diagram showing an exemplary structure of an image sensor provided with a flicker preventing means according to the present invention.

FIG. 8 shows an exemplary construction of an image sensor provided with a flicker preventing means according to the present invention.

When an image of a subject 8 illuminated by a light source 7 such as a fluorescent lamp is taken by using an image sensor 10 through an objective lens 9, light from the light source 7 is distributed through a separately provided lens 11 to a photo sensor 12 which in turn produces a light detection signal corresponding to a quantity of light and transfers the signal to a flickering state detecting circuit 13 by which a period and a phase of flicker in the light source 7 is detected. The detected data on the flicker period and phase of light from the light source 7 is given to an electronic control unit (ECU14) for controlling the operation of the image sensor 10, which unit performs operations on the given data and determines the timing of obtaining the brightest of light of the light source 7. Thus, respective pixel sensor signals from the image sensor 10 are read out under the electronic control unit ECU 14 at the brightest state timing of the light source.

In practice, the driving control of the pixel line selecting circuit 1 in the image sensor 10 is performed under the control of the control unit ECU 14. Since pixel sensor signals read from respective pixels of the image sensor 10 at the brightest state timing of the light source is not synchronized with the video displaying rate, the pixel sensor signals are temporally stored on a frame memory 15 from which they are read according to the video displaying rate.

Specifically, with a light source 7 being driven at the commercial frequency of 50 Hz, pixel sensor signals from respective light sensor circuits of the image sensor 10 are read out at timing of every 10 mS and, therefore, they cannot be read out in synchronism with the video displaying rate of 1/30 (1/50) seconds. For this reason, image information of respective pixels read from the image sensor 10 are temporally stored on a FIFO (First In First Out) memory from which the information is then readout by a reading-out signal generated by a timing generator according to the video displaying rate and transferred to the video display device.

Figure 9:
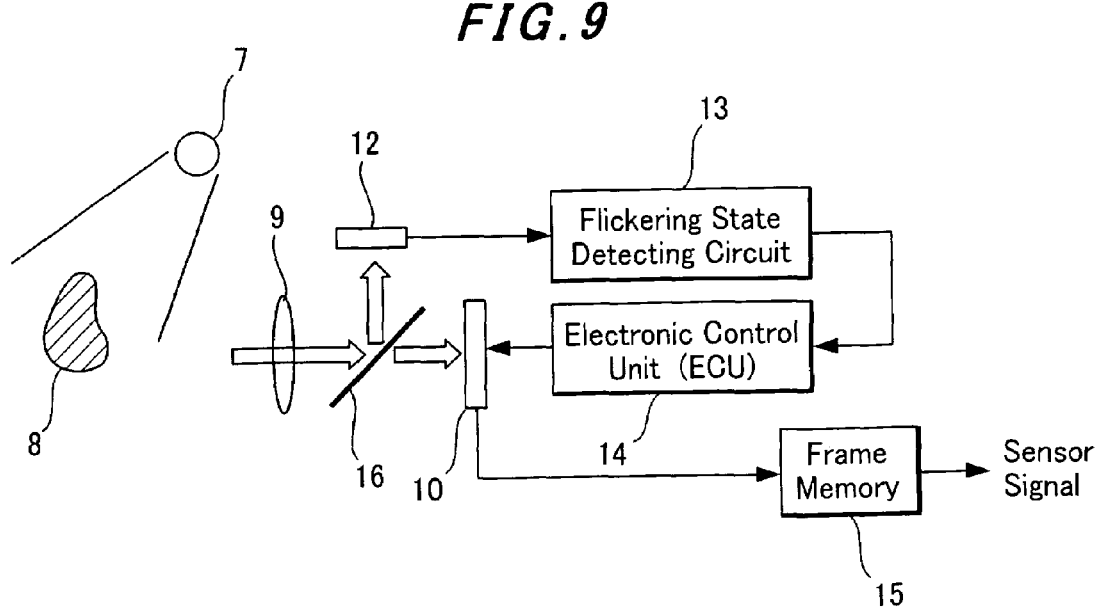
FIG. 9 illustrates another exemplary structure of an image sensor provided with a flicker preventing means according to the present invention.

FIG. 9 shows another image sensor provided with a flicker preventing means according to the present invention. In this embodiment, instead of using a separate objective lens used in the first described embodiment, light from the illuminating source through an objective lens 9 is distributed by a half mirror 16 to a photo sensor 12. In this embodiment, in place of a photo sensor for detecting light from the lamp, which is used in the preceding embodiment, PN junctions of MOS transistors Q1-Q3 composing a unit pixel sensor of the image sensor are used, which characteristics are substantially equal to that of the photo diode and can produce a change in the photo circuit that possess a photo current therein in proportion to incident light for a period of accumulating charge (without outputting sensor signal) when taking an image by the image sensor. From the change in photo current flowing in the PN junction, a period and a phase of flicker of the light source can be determined.

Figure 10:
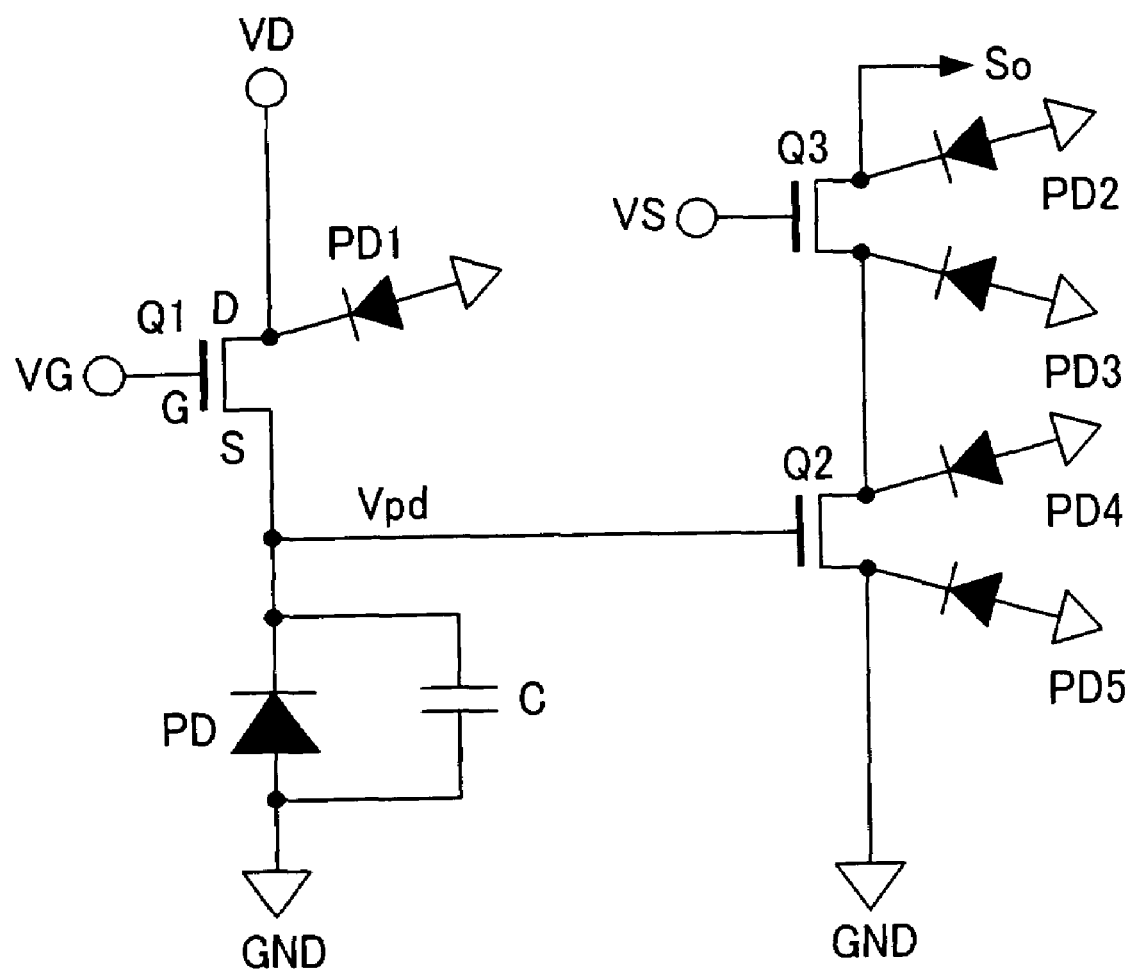
FIG. 10 is an equivalent electric circuit diagram of each transistor in a light sensor circuit when a PN junction of the transistor serves as a photo diode.

FIG. 10 illustrates an equivalent circuit of a light sensor when PN junctions of transistors Q1-Q3 function as photodiodes PD1-PD5 for detecting incident light.

Actually, the transistors Q1-Q3 of each pixel sensor circuit of the image sensor are generally provided with light-shielding means excepting a photodiode PD in order not to cause miss-operation of the transistors. In this case, the complete light-shielding of the transistors is very difficult and incident light may enter parts of the transistors other than the photodiode portion PD.

This may be a problem in particular for an interline type CCD camera. However, it may not cause any trouble with a MOS type image sensor because a pixel sensor signal can be readout from the light sensor circuit even if light entered parts of the transistors other than the photodiode PD. In this instance, the transistor Q3 can maintain the sufficient OFF-characteristic with weak incident light.

The standard CMOS process cannot provide a light shielding effect enough to be usable in the CCD process. Therefore, the CMOS process provides the incomplete light-shield of parts other than the photodiode PD, which allows a small quantity of incident light to enter the parts of the transistors other than the photodiode portion PD.

Basically, it is enough to detect photo current flowing in any one of the photodiodes PD1-PD5 (PN junctions). In this instance, as shown in FIG. 11, it is possible to detect photo current in the photodiode PD2 at the PN junction located on the output side of the transistor Q3 and to output a photocurrent detection signal with no need for providing a special photo-current detecting circuit. For example, in an information-reading circuit (not shown) for reading and quantizing sensor signals output in a time series from respective light sensor circuits of the image sensor, a signal corresponding to a photo current flowing in the photodiode PD2 of the transistor Q3 of each light sensor circuit is read under the control of the electronic control unit (ECU) during the OFF-state of the transistor Q3 to detect the quantity of light and the flicker period of the light source.

Figure 12:
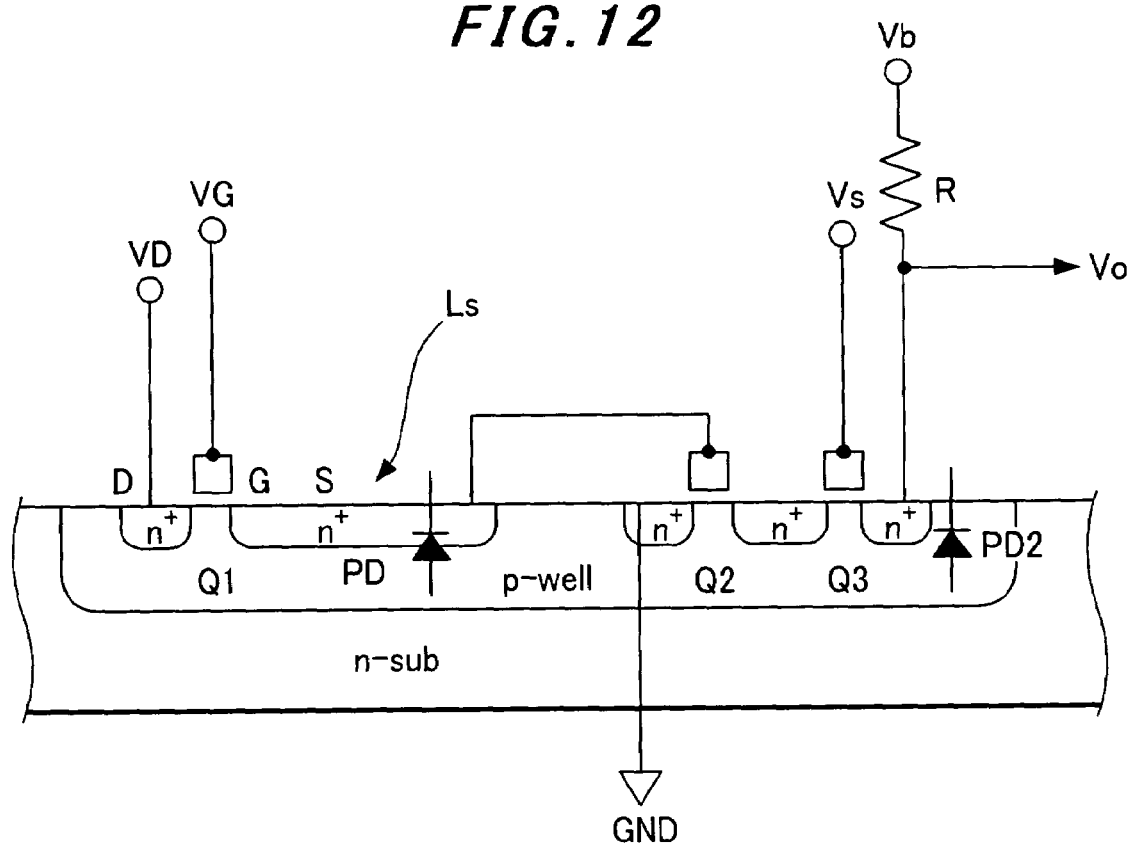
FIG. 12 is a front sectional view of each transistor of a light sensor circuit, wherein respective portions of the transistor formed by a CMOS process are schematically illustrated.

FIG. 12 schematically illustrates the structure of transistors Q1-Q3 and photodiodes PD and PD2 in a light (pixel) sensor circuit formed by the CMOS process.

When light evenly falls on a whole surface of the image sensor composed of a matrix of m×n (lines and columns) pixels and a pixel line selecting circuit 1 is kept in OFF-state (without reading any pixel line) under the control of an electronic control unit (ECU), a pixel selecting circuit 2 is operated to detect signals of corresponding photocurrents flowing in photodiodes PD2 of respective pixels in all pixel lines and output all detected signals at the same time, obtaining a signal having a size of m×n pixels.

When the transistor Q3 is turned ON for a period of outputting a sensor signal, a signal corresponding to a photocurrent flowing in the photodiode PD2 overlaps a sensor signal corresponding to a photocurrent flowing in the photodiode PD. In this case, the sensor signal is amplified by the transistor Q2 and it becomes dominant over the overlapping signal which decreases with a decreasing photocurrent in the photodiode PD2. As the result, the overlapping signal has no significant effect to the pixel sensor signal.

A flicker state detecting circuit 13 works, for example, by binarizing a light detection signal of a light source by using a threshold value, converting the binarized light-detection signal from frequency to voltage and from analog to digital value, detecting a flicker period of the light source and detecting a phase in which the flicker frequency and the frequency of quantized light-detection signal can be possibly close to each other.

Figure 13:
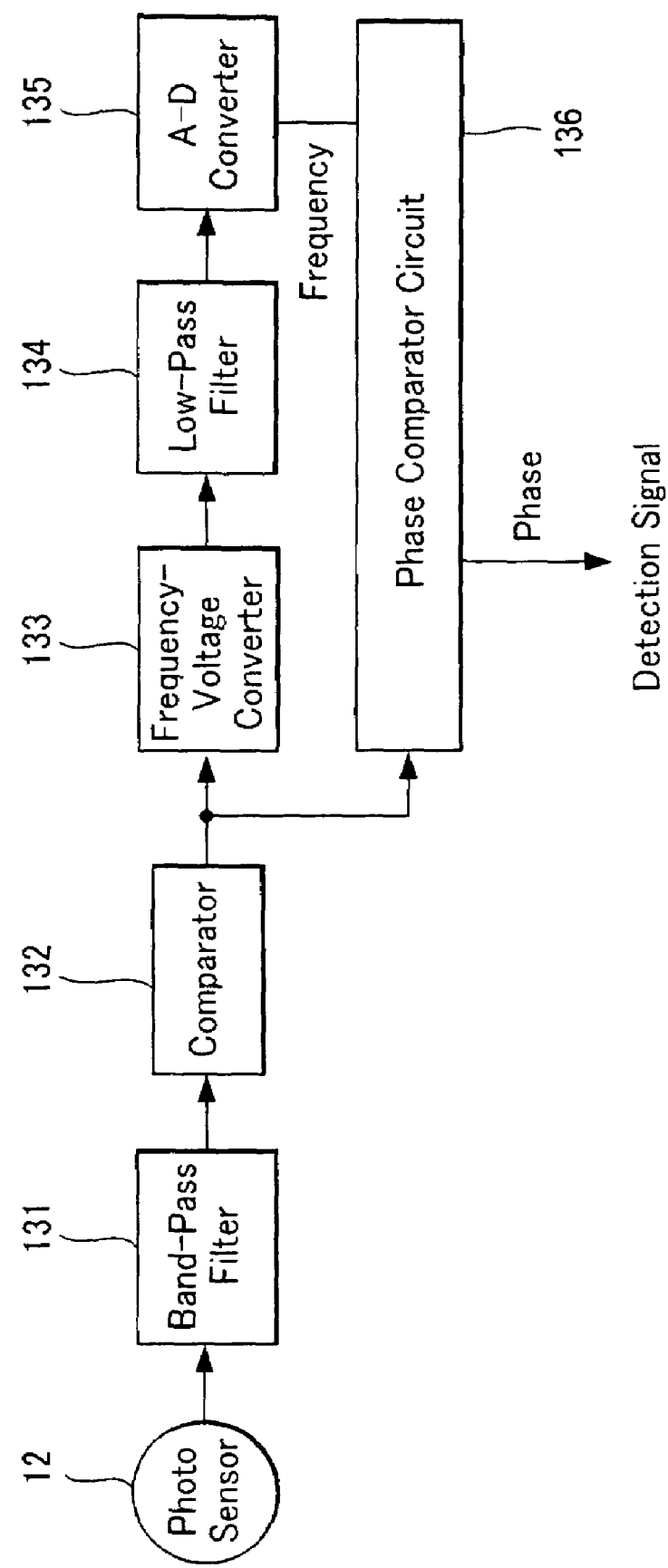
FIG. 13 is a block diagram of an embodiment of a circuit for detecting a flickering state of light from a light source.

FIG. 13 shows a practical construction of a flicker state detecting circuit 13 for the above-mentioned purpose. In this instance, an output of a photo-sensor 12 for detecting light from a light source such as a fluorescent lamp is transferred to a band-pass filter 131 by which necessary frequency components are selectively extracted from the light. Actual flicker in light from the light source has a frequency being twice that of the electric power source. A signal of a frequency band of 100 Hz is extracted by the band-pass filter 131 from the light from the light source connected to the power supply source having a frequency of 50 Hz. The signal passed through the band-pass filter 131 is then transferred to a comparator 132 whereby it is binarized according to a predetermined threshold. The binarized signal is converted by a frequency-voltage converter 133 into a voltage signal which is then converted by an A-D converter 135 into a digital signal. A flicker period (frequency) can now be digitally recognized.

The provision of a low-pass filter 134 between the frequency-voltage converter 133 and the A-D converter 135 makes it possible to absorb variations in frequency. The light-source flicker frequency is determined by rounding (counting fractions of 5 and over as a unit and disregarding the rest) the output of the A-D converter 135. The digital value is then given to a phase comparator 136 which by adjusting the timing of the signal binarized by the comparator 132 can determine the timing of obtaining the highest brightness and detect the phase of the flicker. Since the binary-coded output of the comparator 132 may contain jitter noise resulting from the variations in quantity of light from the light source, the timing is adjusted so that outputs may be in phase by comparison with each other.

Figure 14:
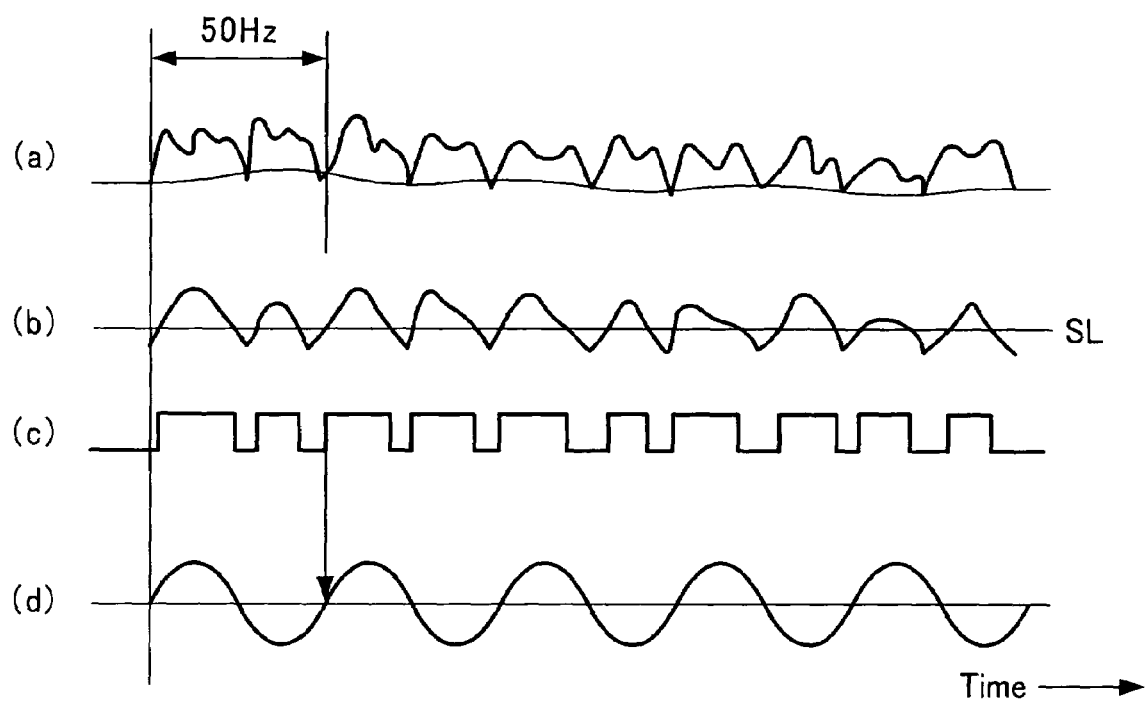
FIG. 14 is a time chart of signals produced at respective portions of the circuit shown in FIG. 13 for detecting a flickering state of light from a light source.

FIG. 14 is a time chart of signals produced in respective portions of the flicker state detecting circuit 13. In FIG. 14, there is shown (a) an output signal of the photo-sensor 12, (b) a signal having passed the band-pass filter 131, (c) a binarized signal of the comparator 132, (d) detection signals of a frequency and a phase of flicker in the light source, where SL is a threshold.

In different method from the preceding method of extracting a necessary component from a signal including noise, the flicker state detecting circuit 13 of the shown embodiment can work by comparing the detection signal with a reference signal with no effect of external light.

The flicker state detecting circuit 13 may be so constructed that it works by converting a light detection signal from analog to digital, detecting a period of flicker by analyzing the flicker frequency, setting the band-pass filter to pass only a flicker frequency component of the detected light signal and detecting a matching phase at which the flicker component signal substantially meets the flicker period of the light source.

Figure 15:
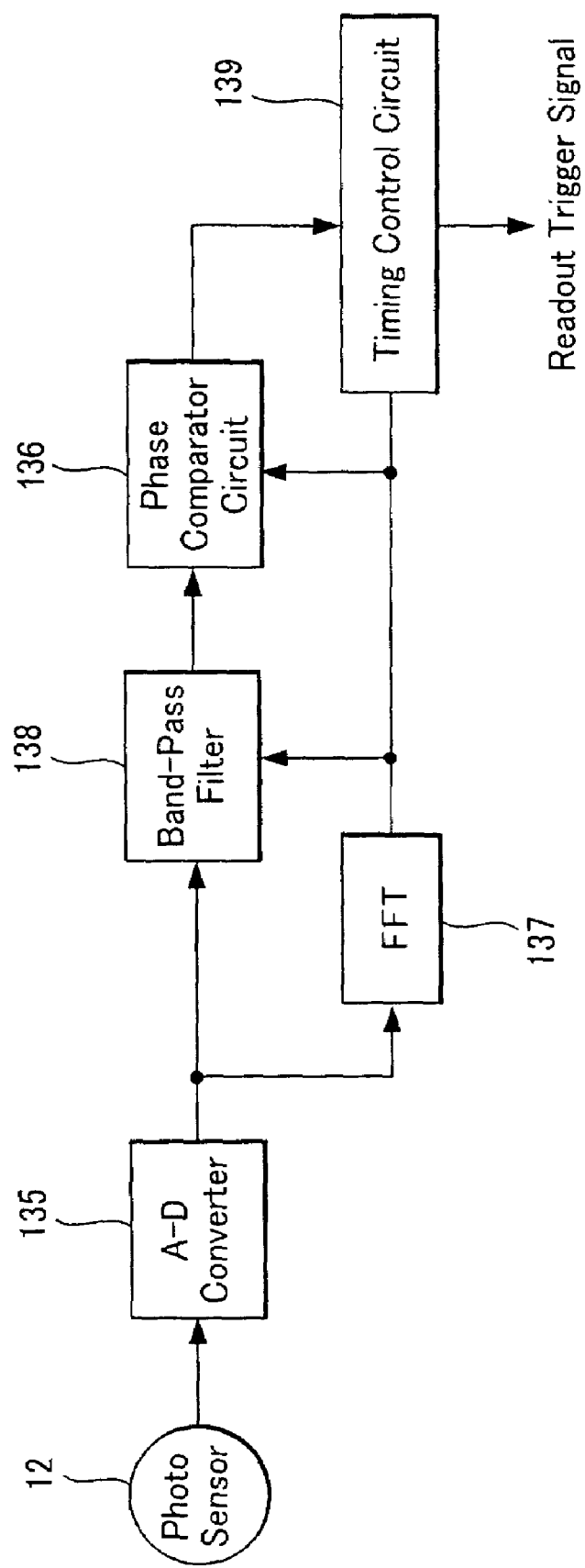
FIG. 15 is a block diagram of another embodiment of a circuit for detecting a flickering state of light from a light source.

FIG. 15 shows a concrete construction of the above-mentioned flicker state detecting circuit 13. An output signal of a photo-sensor 12 is converted by an A-D converter 135 into a digital signal which is then transferred to an FFT circuit 137 where it is analyzed to detect a main flicker frequency of the light source. A band-pass filter (digital filter) 138 is preset to pass light of the detected flicker frequency, thereby only flicker frequency components are transferred to a phase comparator circuit 136 which by comparing a flicker frequency signal from the band-pass filter 138 with the flicker frequency signal output from the FFT circuit 137 determines a most matching phase for the two signals. A timing control circuit 139, using the phase detection signal received from the phase comparator circuit 136 as lock-timing information, adjusts the triggering timing based on the flicker frequency from the FFT circuit 137 so as to output a trigger signal for reading respective pixel sensor signals of an image sensor at a timing when the lamp (light source) attains the maximum brightness of light.

According to the present invention, it is possible to read by scanning respective pixel sensor signals at a high speed at timing when the quantity of light in the light source attains the maximum brightness by detecting a frequency and a phase of flicker in the light source such as a fluorescent lamp, effectively preventing the occurrence of flicker in an image taken and displayed by the image sensor. This also assures to display the most bright image with the maximum quantity of light in the light source.

It is also possible to effectively prevent the occurrence of flicker by reading respective pixel sensor signals at a timing when the quantity of light in the light source attains the minimum value depending upon the preset conditions.

INDUSTRIAL APPLICABILITY

According to the present invention, an image sensor is provided comprising a matrix of light sensor circuits each of which represents a unit pixel and outputs a light sensor signal corresponding to a sensor current proportional to the quantity of incident light falling thereon when taking an image, which circuit is provided with means for detecting a frequency and a phase of flicker in light of the light source by determining a chance in the light detection signal which is a photo current produced by incident light entering a PN junction of a transistor for outputting a sensor signal in a light sensor circuit and means for determining, based on a period and a phase of a flicker detected in light from a light source, timing of attaining the maximum quantity of light in the light source and reading respective pixel signals at the determined timing and which can effectively prevent the occurrence of flicker in an image taken by the image sensor and displayed on the display unit in a simple manner that does not require the adjustment of the timing of storing respective pixel signals and the compensation of the image signal as performed in the conventional devices.

The invention claimed is:

1. An image sensor comprising a number of light sensor circuits each representing a unit pixel and outputting a sensor signal corresponding to a sensor current produced in a photoelectric converting element in proportion to a quantity of light falling thereon when taking an image, characterized in that the image sensor is provided with a flicker state detecting means for detecting a frequency and a phase of a flicker in light of a light source by detecting a change in a light detection signal corresponding to a photo current produced when light from the light source enters a PN junction of a transistor for outputting a sensor signal to detect the photo current in the photodiode at the PN junction located on the output side of the transistor and to output a photo-current detection signal in an information-reading circuit for reading and quantizing sensor signals output in a time series from respective light sensor circuits of the image sensor, the detection signal corresponding to the photo current flowing in the photodiode of the transistor of each light sensor circuit being read under the control of an electronic control unit (ECU) during an OFF-state of the transistor to detect the quantity of light and the flicker period of the light source, means for determining timing when light of the light source attains highest brightness, based on data obtained by the flicker state detecting means and reading respective sensor signals from pixels of an image taken by the image sensor, a frame memory for temporally storing the read sensor signals, and means for reading the stored sensor signals from the frame memory at timing for outputting the signals according to the video displaying rate necessary for displaying a video on a display device.

2. An image sensor comprising a number of light sensor circuits each representing a unit pixel and outputting a sensor signal corresponding to a sensor current produced in a photoelectric converting element in proportion to a quantity of light falling thereon when taking an image, characterized in that the image sensor is provided with means for detecting light from a light source by a photo sensor, binarizing a light detection signal from the light source by using a threshold value, converting the binarized light detection signal from a frequency signal into a voltage signal, converting the voltage signal from an analog signal into a digital signal, detecting a period and a phase of flicker in light of the light source and determining a phase at which the period of the flicker most meets with the frequency of the binarized light detection signal frequency, means for determining timing whereat the light source attains the highest brightness based upon a detected frequency and phase of flicker in light of the light source and reading respective sensor signals from pixels of an image taken by the image sensor, a frame memory for temporally storing the read sensor signals, and means for reading the stored sensor signals from the frame memory at timing for outputting the signals according to the video displaying rate necessary for displaying a video on a display device.

3. An image sensor comprising a number of light sensor circuits each representing a unit pixel and outputting a sensor signal corresponding to a sensor current produced in a photoelectric converting element in proportion to a quantity of light falling thereon when taking an image, characterized in that the image sensor is provided with means for detecting light from a light source by a photo sensor, converting a light detection signal from an analog signal into a digital signal, analyzing a frequency of flicker in the light source, setting a band-pass filter to pass only a flicker frequency component of the light detection signal and determining a phase at which the period of the flicker component signal and the period of the flicker of the light source most match each other, means for determining timing whereat the light source attains the highest brightness based upon a detected frequency and phase of flicker in light of the light source and reading respective sensor signals from pixels of an image taken by the image sensor, a frame memory for temporally storing the read sensor signals, and means for reading the stored sensor signals from the frame memory at timing for outputting the signals according to the video displaying rate necessary for displaying a video on a display device.

* * * * *